(12) United States Patent
Okada et al.

(10) Patent No.: US 7,698,643 B2
(45) Date of Patent: Apr. 13, 2010

(54) PARTS COUNTING DEVICE, PARTS COUNTING PROGRAM, AND PARTS COUNTING METHOD OF 3-DIMENSIONAL ARRANGEMENT ADJUSTMENT CAD

(75) Inventors: Yuki Okada, Tokyo (JP); Shingo Fujii, Tokyo (JP); Takanori Fukagawa, Tokyo (JP); Masahiko Nakahara, Tokyo (JP); Yoshiaki Takahasi, Tokyo (JP); Ryuichi Tachi, Tokyo (JP); Norio Ahiko, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1159 days.

(21) Appl. No.: 10/529,200

(22) PCT Filed: Sep. 25, 2003

(86) PCT No.: PCT/JP03/12253

§ 371 (c)(1),
(2), (4) Date: Dec. 9, 2005

(87) PCT Pub. No.: WO2004/029840

PCT Pub. Date: Apr. 8, 2004

(65) Prior Publication Data

US 2006/0149405 A1    Jul. 6, 2006

(30) Foreign Application Priority Data

Sep. 26, 2002 (JP) ............................. 2002-280786
Jul. 30, 2003 (JP) ............................. 2003-204056

(51) Int. Cl.
    *G06F 3/00*    (2006.01)
(52) U.S. Cl. ................ 715/708; 715/964; 715/705; 715/706; 715/707
(58) Field of Classification Search ................ 715/708, 715/964, 705, 706, 707
    See application file for complete search history.

(56) References Cited

U.S. PATENT DOCUMENTS 4,181,954 A    1/1980    Rosenthal et al.

(Continued)

FOREIGN PATENT DOCUMENTS

GB    2 321 326 A    7/1998

(Continued)

*Primary Examiner*—Simon Ke
(74) *Attorney, Agent, or Firm*—Oblon, Spivak, McClelland, Maier & Neustadt, L.L.P.

(57) ABSTRACT

A quantity totalizer for a three-dimensional arrangement and adjustment CAD includes integrating means for referring to parts information stored in the three-dimensional arrangement and adjustment CAD and associating line information, which is separated from the parts information for storage and which is unique to a line, with the parts information to generate integrated information in which the quantity of parts is totalized; numbering means for systematically numbering the integrated information and outputting a quantity totalization result; and comparing means for comparing the quantity totalization result output by the numbering means with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means. With the above structure, it is possible to provide the quantity totalizer, a quantity totalizing program, and the quantity totalizing method for the three-dimensional arrangement and adjustment CAD, which are capable of improving the efficiency of the quantity totalization in the design with the three-dimensional arrangement and adjustment CAD and performing accurate parts management and design management while reducing the design cost.

19 Claims, 9 Drawing Sheets

U.S. PATENT DOCUMENTS

| | | | |
|---|---|---|---|
| 4,464,719 A | 8/1984 | Spellmann | |
| 5,777,877 A | 7/1998 | Beppu et al. | |
| 6,611,725 B1 * | 8/2003 | Harrison et al. | 700/98 |
| 6,647,380 B1 * | 11/2003 | Yotsukura | 707/2 |
| 6,944,515 B2 * | 9/2005 | Nakajima et al. | 700/105 |
| 6,961,732 B2 * | 11/2005 | Hellemann et al. | 707/102 |
| 7,047,237 B2 * | 5/2006 | Suzuki et al. | 707/3 |
| 7,302,443 B2 * | 11/2007 | Nakajima et al. | 707/102 |
| 7,376,602 B2 * | 5/2008 | Zulpa et al. | 705/29 |
| 7,490,301 B2 * | 2/2009 | Fujieda | 715/853 |
| 2002/0026385 A1 * | 2/2002 | McCloskey et al. | 705/27 |

FOREIGN PATENT DOCUMENTS

| | | |
|---|---|---|
| JP | 05-334316 | 12/1993 |
| JP | 06-309418 | 11/1994 |
| JP | 08-44792 | 2/1996 |
| JP | 09-171519 | 6/1997 |
| JP | 11-338702 | 12/1999 |
| JP | 2000-67099 | 3/2000 |
| JP | 2000-268066 | 9/2000 |
| JP | 2000-305973 | 11/2000 |
| JP | 2000-331065 | 11/2000 |
| JP | 2001-323658 | 11/2001 |
| JP | 2002-269402 | 9/2002 |

* cited by examiner (TABLE 3)

| COMPARE AND THEN CHECK LINE NAMES | PARTS TYPES | SIZE | MANUAL NUMBERING |
|---|---|---|---|
| B | C | D | ○ |

(TABLE 2A)

| COMPARE AND THEN CHECK LINE NAMES | TYPES | SIZE |
|---|---|---|
| B | C | D |

22 EXTRACTING MEANS (COINCIDENCE)

(TABLE 11)

| PARTS NUMBER | COMPARE AND THEN CHECK LINE NAMES | PARTS TYPES | SIZE | MANUAL NUMBERING |
|---|---|---|---|---|
|  | B | C | D | ○ |

MANUAL NUMBERING MEANS — 23

(TABLE 2B)

| PARTS NUMBER | COMPARE AND THEN CHECK LINE NAMES | PARTS TYPES | SIZE | MANUAL NUMBERING |
|---|---|---|---|---|
| A | B | C | D | ○ |

FIG. 6

(TABLE 3)

| COMPARE AND THEN CHECK LINE NAMES | PARTS TYPES | SIZE | MANUAL NUMBERING |
|---|---|---|---|
| B | C | D | ○ |
| B' | C' | D' |  |

FIG. 7

(TABLE 11A)

| PARTS NUMBER | COMPARE AND THEN CHECK LINE NAMES | PARTS SPECIFICATION | NUMBER OF PARTS |
|---|---|---|---|
|  | B | E | F |
|  | B' | E | G |

FIG. 8A (TABLE 11B)

| PARTS NUMBER | COMPARE AND THEN CHECK LINE NAMES | PARTS SPECIFICATION | NUMBER OF PARTS |
|---|---|---|---|
|  | (-) | E | F + G |

FIG. 8B (TABLE 11C)

| PARTS NUMBER | COMPARE AND THEN CHECK LINE NAMES & PARTS SPECIFICATION | NUMBER OF PARTS | PARENT-CHILD RELATIONSHIP |
|---|---|---|---|
| A | B | E | PARENT |
| A' | B' | F | PARENT |

FIG. 9A (TABLE 11D)

| PARTS NUMBER | COMPARE AND THEN CHECK LINE NAMES & PARTS SPECIFICATION | NUMBER OF PARTS | PARENT-CHILD RELATIONSHIP |
|---|---|---|---|
| A | B | E | PARENT |
| A | B' | F | CHILD |

(TABLE 11D)

| PARTS NUMBER | COMPARE AND THEN CHECK LINE NAMES & PARTS SPECIFICATION | NUMBER OF PARTS |
|---|---|---|
| A | B | E + F |

FIG. 9B

| | |
|---|---|
| (PROCESS 1)<br>INITIAL STATE OF UNCOUNTABLE PARTS TOTALIZED ACCORDING TO THE SAME SPECIFICATION. LENGTH TOWARD BOTH ENDS REPRESENTS FIXED LENGTH. | |
| (PROCESS 2)<br>SUBTRACT TRUE LENGTHS OF UNCOUNTABLE PARTS FROM FIXED LENGTH TO CALCULATE EXTRA LENGTHS AND SORT UNCOUNTABLE PARTS IN ASCENDING ORDER OF EXTRA LENGTH | |
| (PROCESS 3)<br>COMPARE TRUE LENGTH WITH EXTRA LENGTH IN NEXT HIGHER LEVEL IN ASCENDING ORDER OF EXTRA LENGTH TO SEARCH FOR UNCOUNTABLE PART HAVING TRUE LENGHT SMALLER THAN EXTRA LENGTH | |
| (PROCESS 4)<br>SEARCH FOR UNCOUNTABLE PART THAT HAS SMALLEST EXTLA LENGTH BEING CAPABLE OF INCLUDING TRUE LENGTH SEARCHED FOR IN PROCESS 3 | |
| (PROCESS 5)<br>ADD TRUE LENGTH SEARCHED FOR IN PROCESS 3 TO UN-COUNTABLE PART SEARCHED FOR IN PROCESS 4 AND DELETE ORIGINAL UNCOUNT-ABLE PART TO WHICH TRUE LENGTH IS ADDED | |
| (PROCESS 6)<br>CALCULATE EXTRA LENGTH AGAIN AND SORT UNCOUNT-ABLE PARTS IN ASCENDING ORDER OF EXTRA LENGTH | |
| (PROCESS 7)<br>REPEAT THE SAME PROCESSES UNTIL FIXED LENGTH IS GIVEN | |

FIG. 12

PARTS COUNTING DEVICE, PARTS COUNTING PROGRAM, AND PARTS COUNTING METHOD OF 3-DIMENSIONAL ARRANGEMENT ADJUSTMENT CAD

TECHNICAL FIELD

The present invention relates to a quantity totalizer, a quantity totalizing program, and a quantity totalizing method for a three-dimensional 10 arrangement and adjustment computer-aided design system (CAD), which are adopted to totalize the quantity of parts stored in the three-dimensional arrangement and adjustment CAD. The three-dimensional arrangement and adjustment CAD arranges the parts in a three-dimensional space to produce a design drawing.

BACKGROUND ART

Three-dimensional arrangement and adjustment CADs are design tools, each having a function of arranging parts selected from a parts library, which is the database for storing a parts data group, in a three-dimensional virtual space with a graphics interface and of outputting the information concerning the arrangement of the parts as a designs drawing.

The information concerning the arrangement of the parts is stored in an arrangement information database in a three-dimensional arrangement and adjustment CAD. In the quantity totalization for classifying the arranged parts and totalizing the total number of the parts, countable parts (such as valves and joints) in the arrangement information database are counted and the total length of uncountable parts (parts, such as pipes, which are purchased in units of a fixed length and adjusted to a length for use after the procurement) is calculated to produce a quantity sheet.

Accordingly, checking the design drawing produced with the three-dimensional arrangement and adjustment CAD against the quantity sheet can provide detailed information concerning the parts arranged in the design drawing.

A known quantity totalizer stores the data in a three-dimensional arrangement and adjustment CAD and attribute data, which is the information indicating the attribute of each object and which is associated with the data in the three-dimensional arrangement and adjustment CAD, and classifies equipment or the like based on the attribute data extracted by an attribute-data extracting unit (for example, Japanese Unexamined Patent Laid-open (KOKAI) Publication HEI No. 9-179891).

However, detailed information is given to each part stored in a parts library in the three-dimensional arrangement and adjustment CAD and, thus, an enormous amount of data is stored in the parts library. As a result, it takes an increased amount of time to manage, for example, add, modify, or delete, the data concerning the parts. In addition, the increased amount of data in the parts library tends to disadvantageously cause errors at a time of inputting the data.

In the design with known three-dimensional arrangement and adjustment CADs, there are cases in which three-dimensional arrangement and adjustment CADs that output the quantity totalization results and the drawings as a set are used and cases in which three-dimensional arrangement and adjustment CADs that output only the quantity sheets, apart from the design with the three-dimensional arrangement and adjustment CAD, are used. In the case of the three-dimensional arrangement and adjustment CADs that output only the quantity sheets, the drawings are not associated with the quantity sheets. Even in the three-dimensional arrangement and adjustment CADs that output the quantity totalization results and the drawings as a set, since the parts in the design drawings are separately numbered for every drawing, the parts numbers common to all the drawings cannot be systematically assigned. For example, different parts number is assigned to the same part for every design drawing. Accordingly, there is a disadvantage of, for example, not being capable of directly and exclusively associating all the parts in all the drawings with the quantity totalization results.

Furthermore, different types of three-dimensional arrangement and adjustment CADs are often used in different design fields (pipes, cable trays, steel products, and ducts) and, therefore, a unique data format or a unique quantity totalization function is used for every three-dimensional arrangement and adjustment CAD. Consequently, it is difficult to provide a common data format and a common quantity totalization function or to standardize the data format and the quantity totalization function, and it is also difficult to integrate the three-dimensional arrangement and adjustment CADs with each other to collectively perform the quantity totalization.

In the design with the three-dimensional arrangement and adjustment CADs, various types of forms are required in each section according to the purpose. Separate preparation of the various types of forms diversifies the forms to make the preparation and management of the forms complicated. As a result, it is likely to cause errors in the preparation and management of the forms. This is not acceptable with the object of the design management and the reduction in cost.

However, since known three-dimensional arrangement and adjustment CADs only show which parts are arranged in the three-dimensional space, they are not suitable for preparation of the forms, such as specifications or purchase orders, required after the arrangement and adjustment.

When known design tools are used, it is difficult to smoothly reflect the revisions resulting from design changes in the quantity totalization result. For example, piping design undergoes many revisions due to design changes and the parts are frequently added or deleted. Quantity totalization systems accommodated to such frequent design changes have not been developed and, thus, it takes a much amount of time to complete the piping design.

Since all the data concerning the accessories of the parts must be input in the database in the three-dimensional arrangement and adjustment CAD, an enormous amount of data is stored in the parts library.

In view of the actual arrangement or procurement of parts in plant construction, there are the following problems:

(1) There is a problem of advance procurement of the material of the parts. The quantity totalization with the three-dimensional arrangement and adjustment CAD is performed as a preliminary step for the procurement. That is, the arrangement and adjustment must be completed in the three-dimensional arrangement and adjustment CAD before the procurement of the parts.

Practically, since it is necessary to procure the parts and the material at an earlier stage due to the delivery date or process, the parts are often procured before the specifications are determined. However, known three-dimensional arrangement and adjustment CADs, which adopt automatic numbering, have no way to resolve this contradiction. Hence, the quantity totalization is forestalled and is actually used only for confirming the difference between the advance procurement and the quantity totalization.

(2) There is a problem of bulk purchase of the parts and material. Since the quantity totalization results are output for every specification of the parts in known quantity totalizing methods with the three-dimensional arrangement and adjustment CADs, only the number of the parts calculated for every specification can be yielded.

However, practically, with the object of easiness of the arrangement and procurement, the bulk purchase in which compatible parts are collectively purchased with the parts having higher specification is frequently performed in spite of being rather out of specification. In the quantity totalization with known three-dimensional arrangement and adjustment CADs, it is not possible to collectively totalize the multiple parts in different groups.

(3) Another problem concerns a method of calculating the number of uncountable parts with a yield rate being considered. In the quantity totalization method with known three-dimensional arrangement and adjustment CADs, the total length of the uncountable parts is simply output for every specification and the yield rate is not considered. Furthermore, there is no method of totalizing the parts purchased in units of fixed length while considering the yield rate of the parts.

(4) Known quantity totalizing methods with the three-dimensional arrangement and adjustment CADs suppose that the quantity totalization is performed after the design with the three-dimensional arrangement and adjustment CADs is completed and the parts numbers are numbered for every specification. Hence, there is a problem of causing a critical path in that the design must be completed with the three-dimensional arrangement and adjustment CADs before the procurement.

In order to resolve the above problems, it is an object of the present invention to provide a quantity totalizer, a quantity totalizing program, and a quantity totalizing method for a three-dimensional arrangement and adjustment CAD, which are capable of improving the efficiency of the quantity totalization in the design with the three-dimensional arrangement and adjustment CAD and performing accurate parts management and design management while reducing the design cost and the time required for the design work.

It is another object of the present invention to provide a quantity totalizer, a quantity totalizing program, and a quantity totalizing method for a three-dimensional arrangement and adjustment CAD, which are capable of considering advance arrangement and procurement of parts and improving a yield rate.

DISCLOSURE OF THE INVENTION

In order to resolve the above problems, a quantity totalizer for a three-dimensional arrangement and adjustment CAD, according to the present invention, is characterized by including integrating means for referring to parts information stored in the three-dimensional arrangement and adjustment CAD and associating line information, which is separated from the parts information for storage and which is unique to a line, with the parts information to generate integrated information in which the quantity of parts is totalized; numbering means for systematically numbering the integrated information and outputting a quantity totalization result; and comparing means for comparing the quantity totalization result output by the numbering means with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

The parts information preferably includes a parts type and a size in the quantity totalizer for the three-dimensional arrangement and adjustment CAD.

The quantity totalizer for the three-dimensional arrangement and adjustment CAD preferably further includes, when uncountable parts are processed, reducing means for dividing the length of the uncountable parts by a fixed length of countable parts for reduction to the number of the countable parts having the fixed length when the uncountable part is longer than the fixed length and for summing up the lengths of the uncountable parts until the fixed length is given for reduction to the number of the countable parts having the fixed length when the uncountable part is shorter than the fixed length.

The quantity totalizer for the three-dimensional arrangement and adjustment CAD may include converting means for converting the parts information stored in the three-dimensional arrangement and adjustment CADs of different types into a uniform data format to collectively manage the converted parts information.

The quantity totalizer for the three-dimensional arrangement and adjustment CAD may include checking means for checking the integrated information against a past quantity totalization result to number parts that have not been numbered.

A quantity totalizer for a three-dimensional arrangement and adjustment CAD, according to the present invention, is characterized by including integrating means for referring to parts information stored in the three-dimensional arrangement and adjustment CAD and associating line information, which is separated from the parts information for storage and which is unique to a line, with the parts information to generate integrated information in which the quantity of parts is totalized; numbering means for systematically numbering the integrated information and outputting a quantity totalization result; comparing means for comparing the quantity totalization result output by the numbering means with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means; extracting means for classifying the parts into automatically numbered parts and manually numbered parts and extracting the parts information and the line information, concerning the manually numbered parts, from a database in the three-dimensional arrangement and adjustment CAD for check; and manually-numbering means for manually numbering the parts having the parts information and the line information extracted by the extracting means.

Attribute information concerning the parts, extracted and checked by the extracting means in order to determine the parts manually numbered by the manually-numbering means, preferably includes all of a line name, a parts type, and a size or includes only the parts type and the size in the quantity totalizer for the three-dimensional arrangement and adjustment CAD.

The parts information may be integrated with the line information, which are extracted by the extracting means, to produce a parts list; at least one parts number that is determined in advance may be manually input in the parts list by the manually-numbering means; and the manually input data may be reflected in the parts number column in the database in the three-dimensional arrangement and adjustment CAD.

The integrating means may refer to the line information and the database in the three-dimensional arrangement and adjustment CAD, in which the manually input data input by the manually-numbering means is reflected, to separate the automatically numbered parts from the manually numbered parts and may totalize the number of countable parts and the total length of uncountable parts to produce the quantity totalization result. The integrating means may separate the automatically numbered parts from the manually numbered parts for quantity totalization; may compare the information before a revision with the information after the revision; and may add a shortfall before the revision to the information after the revision when the number of parts before the revision is smaller than the number of parts after the revision.

A symbol indicating that a yield rate is considered, the symbol being attribute information, may be added to the line information to separate parts for which the yield rate is considered from parts for which the yield rate is not considered; the parts information and the line information concerning uncountable parts stored in the database in the three-dimensional arrangement and adjustment CAD may be extracted by the extracting means for check to determine the uncountable parts for which the yield rate is considered; true lengths, which are the actual lengths of the uncountable parts, may be calculated by the reducing means for the uncountable parts for which the yield rate is considered; and extra lengths, which is the difference between the true lengths and a fixed length at the time of purchase, input in advance, may be calculated.

A symbol indicating that a yield rate is considered, the symbol being attribute information, may be added to the line information to separate parts for which the yield rate is considered from parts for which the yield rate is not considered; the parts information and the line information concerning uncountable parts stored in the database in the three-dimensional arrangement and adjustment CAD may be extracted by the extracting means for check to determine the uncountable parts for which the yield rate is considered; a fixed length, which is the length of the uncountable parts at time of purchase, may be input by the manually-numbering means; the fixed length may be subtracted from true lengths, which are the lengths of the uncountable parts for which the yield rate is considered, when the true lengths are larger than the fixed length to reduce the uncountable parts to uncountable parts having lengths smaller than the fixed length; extra lengths may be calculated by subtracting the true lengths, which is the actual lengths of the uncountable parts, from the fixed length to compare the true lengths of all the parts for which the extra lengths are calculated with the extra lengths thereof; addition of a longest true length to a shortest extra length may be repeated to reduce the uncountable parts to the countable parts having the fixed length; and the number of the countable parts having the fixed length may be totalized.

In order to resolve the above problems, a quantity totalizing program for a three-dimensional arrangement and adjustment CAD, according to the present invention, is characterized by including integrating means for referring to parts information stored in the three-dimensional arrangement and adjustment CAD and associating line information, which is separated from the parts information for storage and which is unique to a line, with the parts information to generate integrated information in which the quantity of parts is totalized; numbering means for systematically numbering the integrated information and outputting a quantity totalization result; and comparing means for comparing the quantity totalization result output by the numbering means with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

A quantity totalizing program for a three-dimensional arrangement and adjustment CAD, according to the present invention, is characterized by including integrating means for referring to parts information stored in the three-dimensional arrangement and adjustment CAD and associating line information, which is separated from the parts information for storage and which is unique to a line, with the parts information to generate integrated information in which the quantity of parts is totalized; numbering means for systematically numbering the integrated information and outputting a quantity totalization result; comparing means for comparing the quantity totalization result output by the numbering means with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means; extracting means for classifying the parts into automatically numbered parts and manually numbered parts and extracting the parts information and the line information, concerning the manually numbered parts, from a database in the three-dimensional arrangement and adjustment CAD for check; and manually-numbering means for manually numbering the parts having the parts information and the line information extracted by the extracting means.

In order to resolve the above problems, a quantity totalizing method for a three-dimensional arrangement and adjustment CAD, according to the present invention, is characterized by including the steps of referring to parts information stored in the three-dimensional arrangement and adjustment CAD and associating line information, which is separated from the parts information for storage and which is unique to a line, with the parts information to generate integrated information in which the quantity of parts is totalized; systematically numbering the integrated information and producing a quantity totalization result; and comparing the quantity totalization result with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

A quantity totalizing method for a three-dimensional arrangement and adjustment CAD, according to the present invention, is characterized by including the steps of referring to parts information stored in the three-dimensional arrangement and adjustment CAD, associating line information, which is separated from the parts information for storage and which is unique to a line, with the parts information, referring to the line information and the parts information stored in the three-dimensional arrangement and adjustment CAD to classify parts into automatically numbered parts and manually numbered parts, and associating the line information with the parts information to generate integrated information in which the quantity of the parts is totalized; extracting the line information concerning the manually numbered parts from a database in the three-dimensional arrangement and adjustment CAD, manually numbering the parts having the extracted line information, and systematically numbering the integrated information to produce a quantity totalization result; comparing the quantity totalization result with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

According to the present invention having the structures described above, it is possible to improve the efficiency of the quantity totalization in the design with the three-dimensional arrangement and adjustment CAD and to perform accurate parts management and design management while reducing the design cost and the time required for the design work, and it is also possible to consider advance arrangement and procurement of the parts and to improve a yield rate.

BRIEF DESCRIPTION OF THE DRAWINGS

FIG. 6 shows a structure (flow) in which parts numbers are manually numbered.

FIG. 7 is a table showing a symbol indicating whether the manual numbering is allowed as attribute information.

FIGS. 8A and 8B are tables showing a quantity totalization method when the parts are totalized based on line names and parts specifications or based only on the parts specifications.

FIGS. 9A and 9B are tables showing a quantity totalizing method in which the parts having different specifications are processed as the same part according to the same parts number and parent-to-child relationship.

FIG. 12 illustrates processes for reducing the uncountable parts to the countable parts in consideration of the yield rate to calculate the number of the countable parts.

BEST MODE FOR EMBODYING THE INVENTION

Embodiments of a quantity totalizer, a quantity totalizing program, and a quantity totalizing method for a three-dimensional arrangement and adjustment CAD, of the present invention, will be described with reference to the accompanying drawings.

Figure 1:
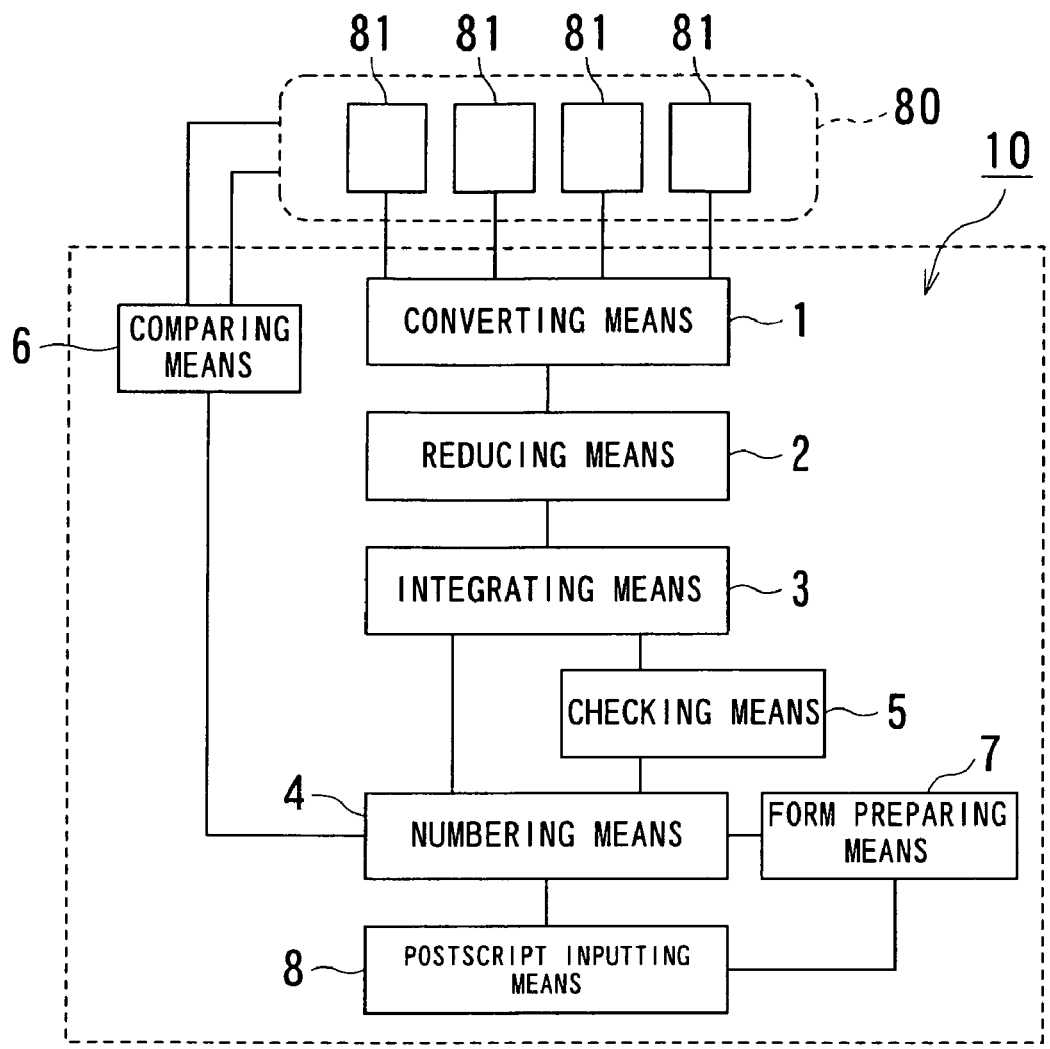
FIG. 1 is a schematic diagram showing a structure of a quantity totalizer for a three-dimensional arrangement and adjustment CAD according to an embodiment of the present invention.

FIG. 1 shows the structure of a quantity totalizer 10 for a three-dimensional arrangement and adjustment CAD, according to a first embodiment of the present invention.

As shown in FIG. 1, the quantity totalizer 10 for the three-dimensional arrangement and adjustment CAD includes: converting means 1 for converting parts information, stored in parts information database groups 81 in a three-dimensional arrangement and adjustment CAD group 80 which includes three-dimensional arrangement and adjustment CADs having different data formats, into a uniform data format; reducing means 2 for reducing uncountable parts, among parts information converted into the uniform data format by the converting means 1, to countable parts; integrating means 3 for associating line information, which is unique for every line and which is stored in a file different from that of the parts information, with the parts information to generate integrated information in which the quantity of parts is totalized; numbering means 4 for systematically numbering the integrated information and outputting a quantity totalization result; checking means 5 for checking the integrated information against a past quantity totalization result when the integrated information integrated by the integrating means 3 results from the second or subsequent quantity totalization; comparing means 6 for comparing the quantity totalization result output by the numbering means with a parts number column in a design drawing produced by the three-dimensional arrangement and adjustment CAD group 80 to determine parts having the same parts information and line information and replacing the parts numbers in the parts number column in the design drawing produced by the three-dimensional arrangement and adjustment CAD group 80 with the parts numbers in the quantity totalization result output by the numbering means 4; form preparing means 7 for selecting necessary information from the quantity totalization result output by the numbering means 4 to output the selected information as a form; and postscript inputting means 8 for inputting a postscript in the quantity totalization result output by the numbering means 4 or in the form output by the form preparing means 7.

A totalizing flow in the quantity totalizer 10 for the three-dimensional arrangement and adjustment CAD will now be described with reference to FIG. 2. According to the first embodiment, piping design is taken as an example.

In the quantity totalizer 10 for the three-dimensional arrangement and adjustment CAD according to the first embodiment, the parts information stored in the parts information database group 81 in a parts library in the three-dimensional arrangement and adjustment CAD group 80 is minimized to speed up the data processing. In other words, in the quantity totalizer 10 for the three-dimensional arrangement and adjustment CAD, the three-dimensional arrangement and adjustment CAD group 80 holds only the minimum parts information required for pipe routing.

In the piping design with the three-dimensional arrangement and adjustment CAD group 80, first, pipes and parts (including valves and joints) are arranged in a virtual space of the three-dimensional arrangement and adjustment CAD group 80 to generate piping lines (lines). In the generation of the piping lines, line names are specified for the pipes and parts as classification items, and the data concerning the parts types (bore, face-to-face dimension, connection form (flange connection or welding), and the diameter of the flange in the flange connection), the sizes, etc. is added to the line names. The information concerning the wall thickness, the material, etc. of the pipes and parts is omitted here. In other words, the parts information database group 81 in the three-dimensional arrangement and adjustment CAD group 80 includes only the minimum parts information, such as the line names, the parts types, and the sizes, required for the piping design.

Next, the parts information in the piping diagram drawn by the three-dimensional arrangement and adjustment CAD groups 80 of multiple types is converted into a uniform data format by the converting means 1. The converting means 1 stores a conversion program for converting the data format.

The parts information converted into the uniform data format is output as uniform-data-format information (Table 1). At this time, the line names (classification items), the parts types, the sizes, and the data on the lengths of the uncountable parts, which are the minimum parts information required for the piping design, are stored in Table 1.

In the uniform-data-format information (Table 1), the number of parts having the same parts type and size is counted to calculate the total number of the parts in each of the lines.

Next, the uniform-data-format information (Table 1) is input in the reducing means 2. When the parts are the uncountable parts (for example, pipes or ducts), the quantity of the uncountable parts is reduced to the number of the countable parts using a part having a fixed length as a measure.

Figure 3:
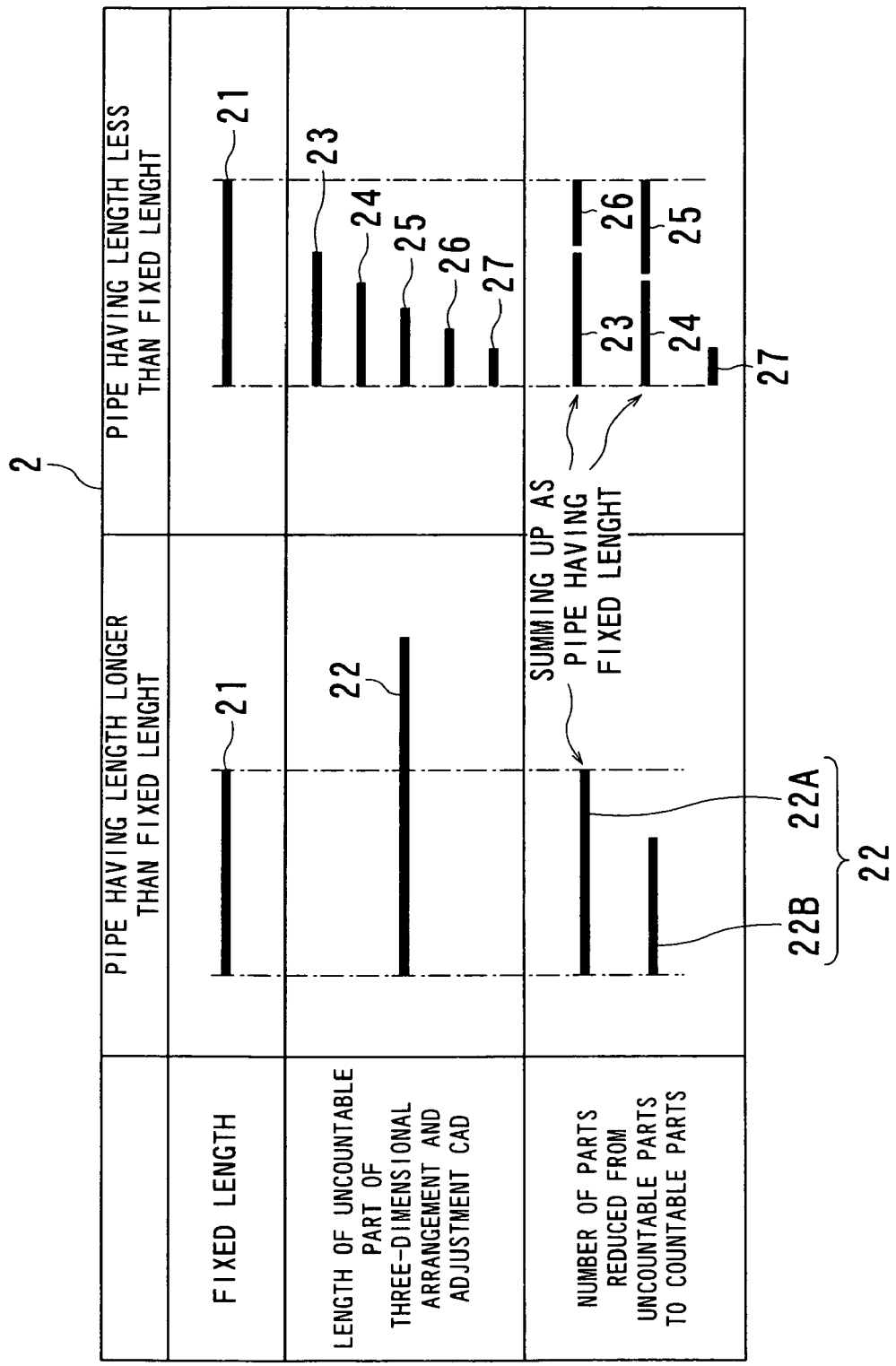
FIG. 3 shows a method of reducing uncountable parts to countable parts.

A method of reducing the uncountable parts to the countable parts, performed by the reducing means 2, will now be described with reference to FIG. 3. In this method, pipes are taken as one example.

For example, when a pipe 21 having the length at the time of purchase is defined as a reference pipe having a fixed length and a pipe 22 is longer than the reference pipe having the fixed length, the length of the pipe 22 is divided by the fixed length of the reference pipe 21 to reduce the pipe 22 to a countable part 22A having the fixed length. The remainder is recognized as an uncountable part 22B having a length less than the fixed length, or as the uncountable part 22B whose length is less than that of the reference pipe.

In the case of pipes 23 to 27 shorter than the reference pipe 21 having the fixed length, the lengths of the uncountable parts are selectively and repeatedly summed up until the reference pipe 21 having the fixed length is given. The uncountable parts having a length equal to the fixed length are counted as the countable parts. For example, summing up the lengths of the pipe 23 to the pipe 26 produces one reference pipe 21 having the fixed length, and summing up the lengths of the pipe 24 to the pipe produces one reference pipe 21 having the fixed length. This operation is repeated and it is determined whether the pipe 27 having a length less than the fixed length, which is the final remainder, is counted as one reference pipe 21 having the fixed length or whether an additional pipe having a length less than the fixed length of the reference pipe 21 is purchased. By reducing the uncountable parts to the countable parts so as to count the number of the countable parts in this manner, the waste in the purchase of the pipes and the likes can be eliminated and the high yielding can be achieved.

Reduced parts information (Table 2) is prepared in the manner described above. In the reduced parts information, the line names, the parts types, and the sizes of the pipes and parts in each of the piping lines designed with the three-dimensional arrangement and adjustment CAD group 80 are added as the parts information, and the uncountable parts are reduced to the countable parts.

In addition to the parts information stored in the three-dimensional arrangement and adjustment CAD group 80, line information (Table 3) concerning each line is prepared. The line information includes the fluid name, the working pressure, the working temperature, the thicknesses of the pipes, the material, the joint geometry of the butt welding, the drawing numbers, the work information, the delivery date, and the procurement number.

The line names, which are the classification items added to the parts information, are checked to integrate the reduced parts information (Table 2) with the line information (Table 3) by the integrating means 3. The reduced parts information (Table 2) and the line information (Table 3) are generated with the data in the three-dimensional arrangement and adjustment CAD group 80. In other words, the data having the same line name is associated with each other for the integration. With this checking and integration, all the information including the parts types, the sizes, the fluid name, the working pressure, and the working temperature, is added to all the pipes and parts as unique data.

The reduced parts information (Table 2) is integrated with the line information (Table 3) by the integrating means 3 to generate integrated information (Table 4). The integrated information (Table 4) does not have the parts numbers added. In other words, all the parts information and the line information, including the line names, the parts types, the sizes, the material, and the thicknesses of the pipes, are stored in the integrated information (Table 4).

Next, the parts numbers are added to all the parts stored in the integrated information (Table 4) by the numbering means 4. In the case of the first design, the integrated information (Table 4) is numbered to assign unique parts numbers to all the parts. It is possible to manage the data concerning all the parts as a whole based on the parts numbers.

In contrast, in the case of the quantity totalization in the second or subsequent design, that is, if the design is changed in the design stage, the integrated information (Table 4) is checked against the quantity totalization results of past revisions by the checking means 5.

Figure 4:
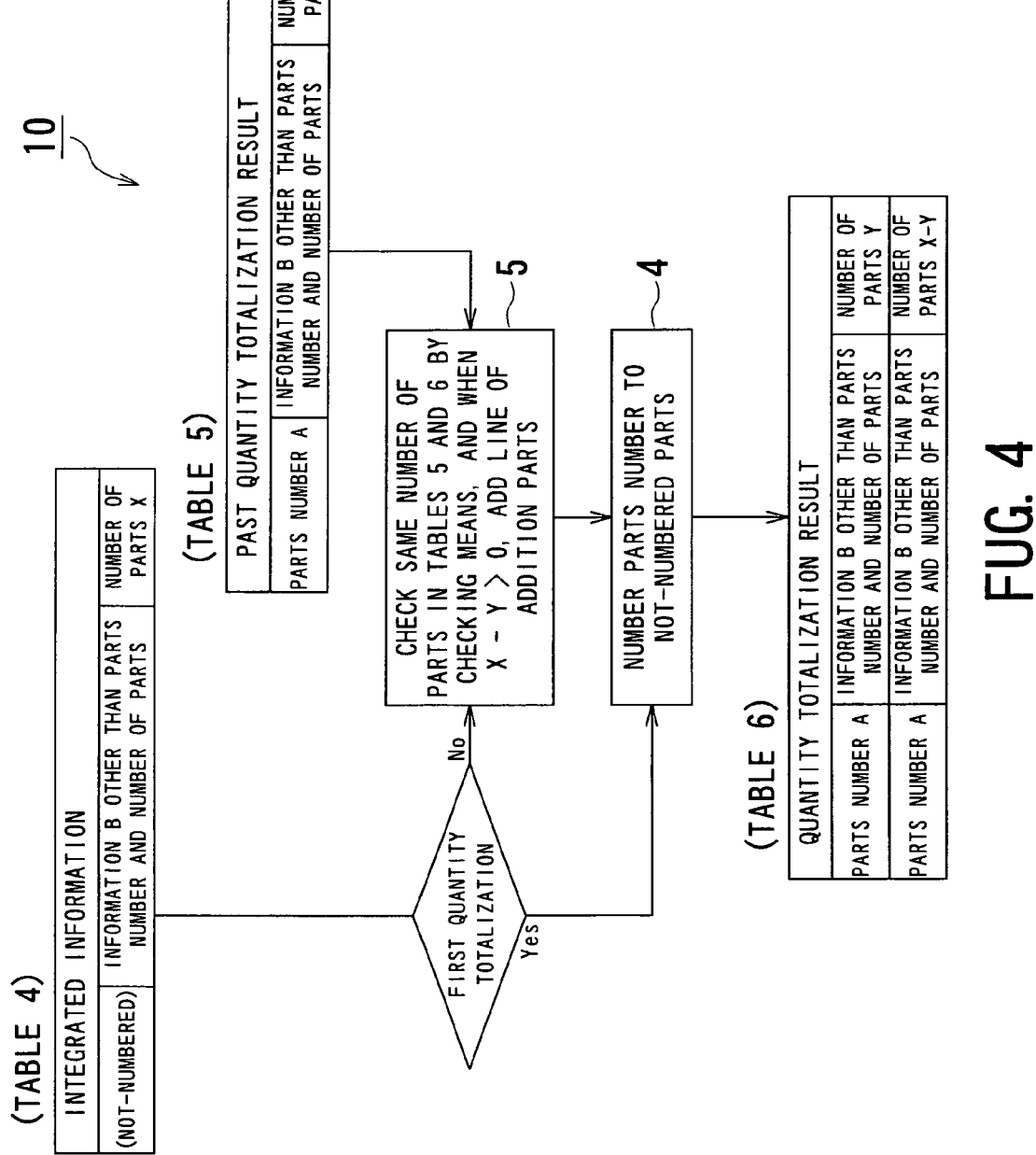
FIG. 4 shows a flow in which a latest quantity totalization result is checked against a past quantity totalization result.

A flow, in which the integrated information (Table 4) is checked against a past quantity totalization result (Table 5) by the checking means 5, will be described hereunder with reference to FIG. 4.

The integrated information (Table 4) is not numbered while the past quantity totalization result (Table 5) is numbered in the past quantity totalization. In the case of the first quantity totalization, the integrated information (Table 4) is directly input in the numbering means 4. In the case of the second or subsequent quantity totalization, the integrated information (Table 4) is input in the checking means 5 and is checked against the past quantity totalization result (Table 5). The number of the parts in the integrated information (Table 4), the parts having the same information (information B other than the parts numbers and the number of the parts in FIG. 4) concerning the line name, the parts type, and the size as the parts in the past quantity totalization result (Table 5), is compared with the number of parts in the past quantity totalization result (Table 5). If the number of the parts in the integrated information (Table 4), the parts having the same information B as in the past quantity totalization result (Table 5), is equal to the number of the parts in the past quantity totalization result (Table 5) (X−Y=0), it is assumed that there is no design change and the integrated information (Table 4) is numbered. If the number of the parts in the integrated information (Table 4), the parts having the same information B as in the past quantity totalization result (Table 5), is larger than the number of the parts in Table 5 (X−Y>0), it is assumed that the parts are additional parts and the line corresponding to the additional parts is added to the past quantity totalization result (Table 5). If the number of the parts in the integrated information (Table 4), the parts having the same information B as in the past quantity totalization result (Table 5), is smaller than the number of the parts in the past quantity totalization result (Table 5) (X−Y<0), it is assumed that the parts are deleted due to the design change, and the integrated information (Table 4) is numbered and the numbered integrated information (Table 4) is output as the quantity totalization result.

A quantity totalization result (Table 6) of the arranged parts and pipes is output in the above manner.

Figure 5:
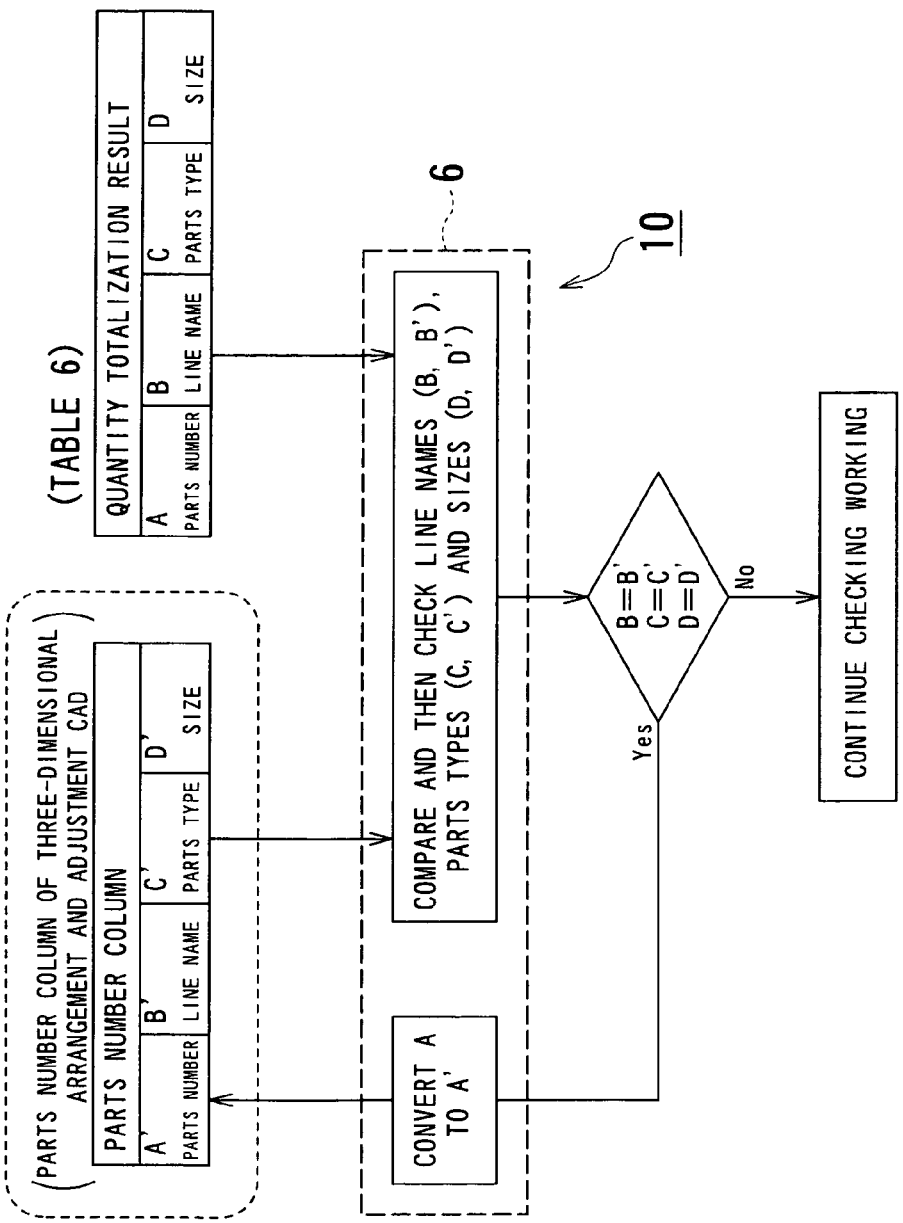
FIG. 5 shows a flow in which parts information in the numbered quantity totalization result is compared with and checked against parts information in a piping drawing.

A flow, in which the quantity totalization result (Table 6) is associated with the design data in the three-dimensional arrangement and adjustment CAD group 80, will be also described hereunder with reference to FIG. 5.

The quantity totalization result of the parts and pipes, output in the quantity totalization result (Table 6), is returned to the three-dimensional arrangement and adjustment CAD group 80, and the returned quantity totalization result is compared with the quantity totalization result of the parts and pipes, in the parts number column in the piping drawing produced with the three-dimensional arrangement and adjustment CAD group 80, by the comparing means 6. In other words, the line names, the parts types, and the sizes recorded in the piping drawing are extracted from the quantity totalization result in the piping drawing and are checked against the line names, the parts types, and the sizes in the quantity totalization result (Table 6). If the line names, the parts types, and the sizes recorded in the piping drawing are equal to the line names, the parts types, and the sizes in the quantity totalization result (Table 6), the parts information in the piping drawing is associated with the parts information in the quantity totalization result (Table 6).

Specifically, the line name B, the parts type C, and the size D in the quantity totalization result (Table 6) are compared with the line name B', the parts type C', and the size D' in the quantity totalization result in the piping drawing produced with the three-dimensional arrangement and adjustment CAD group 80, respectively, by the comparing means 6. As for the parts having the same data in the line names (B, B'), the parts types (C, C'), and the sizes (D, D'), a letter A' in the parts number column in the piping drawing produced with the three-dimensional arrangement and adjustment CAD group 80 is replaced with a parts number A numbered by the quantity totalizer 10 for the three-dimensional arrangement and adjustment CAD of the present invention. The drawing number is assigned to the piping drawing here.

The comparing means 6 has a conversion program as in the converting means 1. The conversion program has a function of converting the data format in the quantity totalization result (Table 6) into the data format in the three-dimensional arrangement and adjustment CAD group 80.

In other words, as for all the parts systematically numbered in the quantity totalization result (Table 6) by the comparison performed by the comparing means 6, the parts numbers of all the parts and pipes arranged in the piping drawing are completely associated with the parts numbers in the quantity totalization result (Table 6). Accordingly, it is possible to produce the piping drawing having the parts numbers systematically numbered with the three-dimensional arrangement and adjustment CAD group 80.

The comparing means 6 may have a conversion function of converting the description language and the unit system. With the comparing means 6 having the conversion function, it is possible to convert the language and unit in the piping drawing and to output the converted result.

Since the parts numbers in the quantity totalization result (Table 6) are directly and exclusively associated with the parts numbers in the piping drawing produced with the three-dimensional arrangement and adjustment CAD group 80, the quantity totalization result (Table 6) can be directly used as a form, such as a valve list or a purchase order. In the engineering design, different sections including factories, construction site, and material procurement departments require different information. Accordingly, only by outputting the necessary parts information from the quantity totalization result in the three-dimensional arrangement and adjustment CAD group 80, the drawing and form can be collectively produced. The templates of the form and the like is stored in the form preparing means 7 as blank forms, and the template optimal to the type of the produced form is selected and used. The output result is output as a form (a table group 7).

The form preparing means 7 may have a conversion function of converting the description language and the unit system. With the form preparing means 7 having the conversion function, it is possible to convert the language and unit in the form and to output the converted result.

Furthermore, the postscript inputting means 8 for later addition is provided in order to add a postscript or a memo, such as a proviso, which is not included in the quantity totalization result (Table 6) or the form (the table group 7), to the piping drawing or the form.

The Table 1 to Table 5 according to the first embodiment do not need to be actually output as lists as long as the tables are recorded in a memory in the computer as databases.

In the quantity totalizer 10 for the three-dimensional arrangement and adjustment CAD having the structure described above, on the one hand, the minimum information incidental to the arranged parts is used to route the pipes in the three-dimensional virtual space. On the other hand, the information concerning the fluid name, the working pressure, the working temperature, and the connection form, which is incidental to the line names of the pipe lines, is provided as an appendix. The information incidental to the arranged parts is linked with the information incidental to the line names of the pipe lines to generate total information. In the total information, the parts are systematically numbered. The template appropriate for the attained quantity totalization result is used to output the information necessary for each section as a form and to output the drawing having the corresponding parts numbers.

As described above, in the quantity totalizer 10 for the three-dimensional arrangement and adjustment CAD, it is possible to associate the forms with the drawing with a little work and to systematically produce the forms, and it is further possible to easily and accurately perform the design tasks and the management of the parts. Since there is no need to input the parts information in the production of the piping drawing and the forms including the valve list, the design work is reduced in time and the design cost is also reduced.

The parts numbers are systematically associated with the forms, so that there is no disadvantage, such as duplication of the parts numbers.

Since the line names are assigned to the pipes as the classification items in the production of the piping drawing, it is sufficient to use the parts types and the sizes as the data to be stored in the three-dimensional arrangement and adjustment CAD. Accordingly, it is not necessary to carry out a complicated input work for every part in the pipe routing. As a result, the piping design can be smoothly performed and the design cost can be effectively reduced.

Furthermore, since all the information concerning the parts is stored as the quantity totalization result and is collectively managed, it is possible to output only the information required for every section in the forms. Consequently, the forms and the drawing can be efficiently produced, thus allowing the design to be efficiently managed.

A change in the number of the parts due to the design change can be accurately reflected in the quantity totalization result, so that the design work relating to the order or the manufacture can be improved. Accordingly, the design work can be smoothly performed at low cost.

Since different types of three-dimensional arrangement and adjustment CADs can be incorporated and used in the system owing to the provision of the reduction tables, the design management, which has been separately performed for every design field, can be collectively performed to realize a user-friendly design system. Accordingly, the design cost and the time required for the design work can be reduced.

With the structure described above, the forms including the parts information and the drawing associated with the parts numbers can be produced and output with little effort in the piping design. Consequently, it is possible to collectively manage the forms in which the parts are systematically numbered and the drawing and to efficiently perform the design work.

A quantity totalizer for a three-dimensional arrangement and adjustment CAD, according to a second embodiment of the present invention, will be further described hereunder with reference to drawings.

Figure 2:
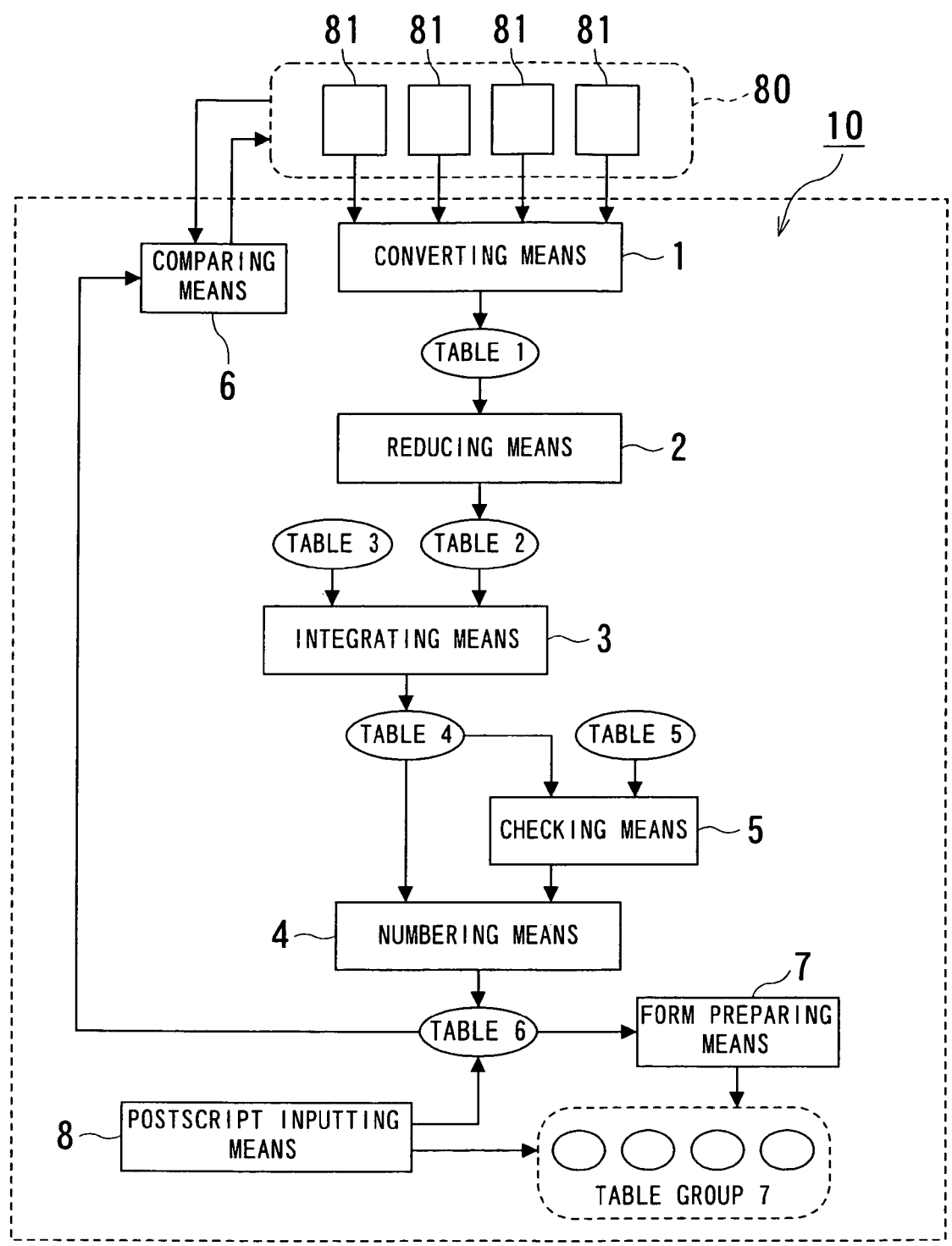
FIG. 2 shows a totalizing flow in the quantity totalizer for the three-dimensional arrangement and adjustment CAD of the present invention.

FIG. 6 shows a flow relating to the reduced parts information (Table 2) shown in FIG. 2. Table 2A is converted to Table 2B in the manner shown in FIG. 6.

The line information (Table 3) in FIG. 6 has a symbol indicating whether manual numbering is allowed as attribute information. Referring to FIG. 6, the attribute information concerning the manual numbering is indicated with a symbol ○. That is, the symbol ○ indicates that the manual numbering is allowed for the part.

The part having the classification item with the symbol ○ is associated with the reduced parts information (Table 2A) by extracting means 22 and the associated result is extracted. If the extracted result includes the parts having the same specifications as in the line information (Table 3), the parts are classified for every specification and the total number of the parts is calculated and stored in one line in manually-numbered parts information (Table 11). The manually-numbered parts information (Table 11) has a column for the manual numbering, in which the user manually inputs the parts numbers that are numbered in advance.

The parts numbers that are manually numbered by the user in advance are input in the manual numbering column in the manually-numbered parts information (Table 11) by manually-numbering means 23.

The manual numbered result (the manually-numbered parts information (Table 11)) is reflected in the database in the three-dimensional arrangement and adjustment CAD in the following manner. First, the content of Table 2A is copied into Table 2B. Then, the content of Table 11 is reflected in Table 2B while referring to a key.

This term "key" means herein the data indicating where in the database in the three-dimensional arrangement and adjustment CAD is referred to in the extraction of the parts. The attribute information, such as line numbers or unique letters, corresponds to the key.

Assigning the manually-numbered reduced parts information (Table 2B) in the database in the three-dimensional arrangement and adjustment CAD to the reduced parts information (Table 2) in FIG. 2 allows the totalization to be performed according to the manually-numbered parts numbers.

However, due to the above operation, the automatically-numbered parts numbers are mixed with the manually-numbered parts numbers in the database in the three-dimensional arrangement and adjustment CAD. Consequently, in the quantity totalizer for the three-dimensional arrangement and adjustment CAD according to the second embodiment, as shown in FIG. 7, the symbol indicating whether the manual numbering is allowed, used as the attribute in the line information (Table 3), is indicated in order to avoid disrupting the system in the quantity totalization. The quantity totalizing method of the parts is classified with this symbol.

In other words, all the parts relating to the classification items for which the manual numbering is not specified in the line information (Table 3) are totalized by the automatic numbering. In contrast, all the parts for which the manual numbering is specified in Table 3 are totalized by the manual numbering.

In the automatic numbering, the sequence numbers may be disorderly assigned or the sequence numbers may be assigned by rule. The quantity totalizer for the three-dimensional arrangement and adjustment CAD, according to the first embodiment of the present invention, adopts the latter numbering method. The parts having the same line name, the parts type, and the size are classified and totalized, and the automatic numbering is performed for the totalization result.

In contrast, in the quantity totalizer for the three-dimensional arrangement and adjustment CAD, according to the second embodiment of the present invention, the parts may be totalized by the manual numbering based only on the attribute information concerning the parts types and the sizes, regardless of the line names as the classification items. The attribute information concerning only the parts types and the sizes is called parts specifications.

FIG. 8A shows the manually-numbered parts information (Table 11A) in which the parts are totalized according to the line information and the parts specifications. FIG. 8B shows the manually-numbered parts information (Table 11B) in which the parts are totalized according to only the parts specifications. Since the manual numbering is used in the manually-numbered parts information (Table 11A and Table 11B), the parts number columns are blank.

As shown in the manually-numbered parts information (Table 11A) in FIG. 8A, when the parts are totalized on the condition that the parts have the same line information and the parts specifications, the parts are classified and tabulated for every line information even if the parts have the same parts specifications E.

As shown in the manually-numbered parts information (Table 11B) in FIG. 8B, when the parts are totalized only on the condition that the parts have the same parts specifications, the parts having the same parts specifications are equally processed and the number of the parts is calculated by summing up the numbers of the parts in the two lines in FIG. 8A. That is, the total number of the parts is F+G. Since the line name is meaningless, the line name is represented by a letter indicating the meaninglessness (by a hyphen (−) in FIG. 8B).

In the manner described above, it is possible to collectively count the parts having the same parts specifications.

In contrast, in order to collectively assign the same parts number when the parts are different in both the line name and the parts specifications or either of them, the parts are numbered in a manner shown in FIGS. 9A and 9B.

In the manner in FIGS. 9A and 9B, symbols representing the parent-to-child relationship are registered as the attribute information in the parts. The parent-to-child relationship here represents which line name or parts specification is to be used in the totalization when the same parts number is assigned to the multiple parts having different line names or parts specifications. Referring to FIGS. 9A and 9B, the line names and the parts specifications are described as the same category.

As shown in FIG. 9A, when there is no parent-to-child relationship between the parts, the part having the parts number A and the part having the parts number A' are processed as parents to prepare the manually-numbered parts information (Table 11C). In this case, in the quantity totalization result (the integrated information, Table 4) reflecting this processing, the parts number A is separated from the parts number A' for the totalization.

In contrast, FIG. 9B shows a case in which the parts have different line names and parts specifications but have the same parts number and, therefore, there is the parent-to-child relationship between the parts. The parts in FIG. 9B are totalized together according to the parent-to-child relationship. As a result of this totalization, the parts numbers and the parent-to-child relationship are registered in the database in the three-dimensional arrangement and adjustment CAD group 80. In the integrated information (Table 4), the line name and parts specification B of the parent is used for the parts number A, and the total number E+F given by adding the number of the parent parts having the parts number A to the number of the child parts having the parts number A is adopted.

Figures 10, 11:
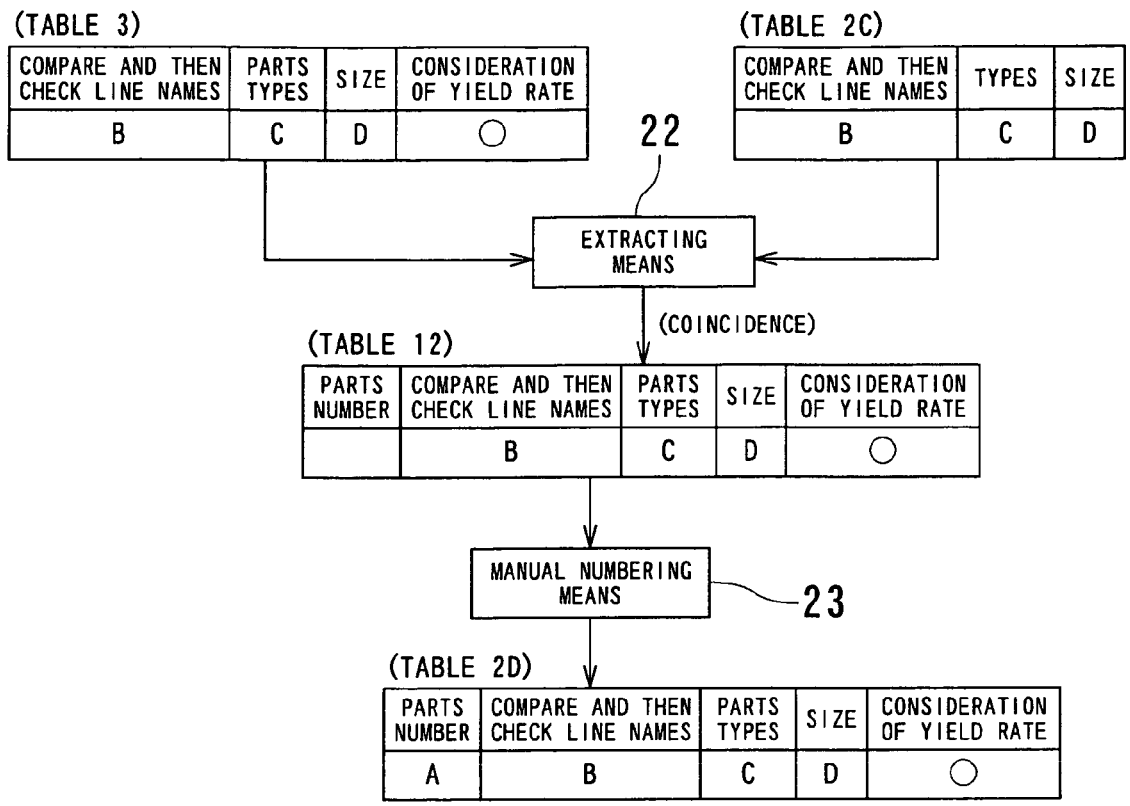
FIG. 10 shows a structure (flow) in which a fixed length is manually input in the quantity totalization when the yield rate of the uncountable parts is considered.
FIG. 11 is a table showing a method of classifying the quantity totalizing method based on whether the yield rate is considered.

A flow in the quantity totalizer when a yield rate is considered will be described hereunder with reference to FIG. 10. Referring to FIG. 10, reduced parts information (Table 2D) prepared from reduced parts information (Table 2C) corresponds to the reduced parts information (Table 2) in FIG. 2. FIG. 10 shows the flow in which the reduced parts information (Table 2C) is converted to the reduced parts information (Table 2D).

Referring to FIG. 10, a symbol indicating that the yield rate is considered is stored in the line information (Table 3) as the attribute information (the part for which the yield rate is considered is indicated with a symbol ○ in FIG. 10).

The part corresponding to the uncountable part having the line information with the symbol ○ is extracted from the reduced parts information (Table 2C) by the extracting means 22. If the extracted result includes the uncountable parts having the same specifications as in the line information (Table 3), the uncountable parts are classified for every specification, and the total length of the uncountable parts stored in the three-dimensional arrangement and adjustment CAD in advance is output for every specification and is stored in one line in yield-rate-considered parts information (Table 12).

The fixed length, which is the length of uncountable parts at time of purchase, is stored in the line information (Table 3) as one attribute. The fixed length must be registered in advance for all the uncountable parts. The yield-rate-considered parts information (Table 12) includes a column in which the fixed length is described, and the user can revise the fixed length to input the revised fixed length in the column.

Next, the user manually inputs the parts numbers in the manual numbering column in the yield-rate-considered parts information (Table 12) with the manually-numbering means 23.

The manual revision of the fixed length is reflected in the database in the three-dimensional arrangement and adjustment CAD in the following manner. First, the content of the reduced parts information (Table 2C) is copied in the reduced parts information (Table 2D). Then, the content of the yield-rate-considered parts information (Table 12) is reflected in the reduced parts information (Table 2D) via a key.

This term "key" means herein the data indicating where in the database in the three-dimensional arrangement and adjustment CAD is referred to in the extraction of the attribute information of the part from the reduced parts information (Table 2C). The attribute information, such as line numbers or unique letters, corresponds to the key.

The use of the reduced parts information (Table 2D) in which the fixed length is manually input as the reduced parts information (Table 2) in FIG. 2 can realize the quantity totalization using the fixed length manually input.

However, due to the above operation, the uncountable parts for which the yield rate is considered are mixed with the uncountable parts for which the yield rate is not considered in the database in the three-dimensional arrangement and adjustment CAD. Consequently, as shown in FIG. 11, the symbol indicating whether the yield rate is considered, used as the attribute of the classification items in Table 3, is indicated in order to avoid disrupting the system in the quantity totalization. The quantity totalizing method of the parts is classified with this symbol.

In other words, all the uncountable parts relating to the classification items for which the yield rate is not specified in Table 3 are totalized in a state in which the yield rate is not considered. In contrast, all the uncountable parts for which the yield rate is specified in Table 3 are totalized in a state in which the yield rate is considered.

FIG. 12 shows an actual manner of calculating the yield rate.

[Process 1] The uncountable parts having the same specification including the fixed length are totalized. This is called an initial state. Referring to FIG. 12, the true lengths are shown by solid lines, while the extra lengths, each given by subtracting the true length from the fixed length, are shown by broken lines. The processing performed in the following processes is highlighted with boxes enclosing the processing.

[Process 2] The true lengths of the uncountable parts are subtracted from the fixed length to calculate the extra lengths, and the uncountable parts are sorted in ascending order of extra length. The true lengths are denoted by reference numeral a, b, c, and d in descending order. The subtraction of each of the true lengths a, b, c, and d from the fixed length gives an extra length a', an extra length b', an extra length c', and an extra length d'.

[Process 3] True lengths are compared with the extra lengths in the next higher level in ascending order of extra length to search for an uncountable part having the true length smaller than the extra length. If the corresponding uncountable part is not searched for, the yield rate cannot be further considered. In this example, the true length c is smaller than the extra length b'. That is, the uncountable part for which the yield rate can be considered (the part corresponding to the true length c) is searched for.

[Process 4] An uncountable part that has the smallest extra length being capable of including the true length c searched for in Process 3 is searched for in order to integrate the longest uncountable part for which the yield rate can be considered with the smallest extra length. In this example, the part having the true length a can include the true length c.

[Process 5] The true length c searched for in Process 3 is added to the true length a, and the part having the true length c is deleted.

[Process 6] The extra lengths are calculated again and the parts are sorted in ascending order of extra length. In this process, the uncountable part including the part for which the addition is performed in the previous process is included in the calculation.

[Process 7] The true length d is added behind the true length c in the above manner.

The above processes are repeated until it is determined that the yield rate cannot be further considered to yield the optimum number of parts having the fixed length.

Specific examples of the quantity totalizer for the three-dimensional arrangement and adjustment CAD, according to the second embodiment, will be then described hereunder.

The quantity totalization of the pipes and the procurement of the parts based on the quantity totalization result are often performed before a detailed arrangement and adjustment of the pipes is completed. This is because the plant engineering including the pipes and the cable trays is performed on the assumption that the steel work, the building, the groundwork, and the equipment are fixed. Accordingly, the plant engineering is positioned downstream in the entire design schedule.

Coordination between the departments, modeling with three-dimensional arrangement and adjustment CAD, and accurate quantity totalization often lag far behind.

The pipe parts for the piping are manufactured from ingots. Hence, in order to purchase the cheapest piping parts, it is preferable that the pipe parts be purchased in time with melting of the ingots in the steel product manufacturer with regard to the cost.

In consideration of the actual procurement of the parts, it is a rare case in actual that the quantity totalization can be performed by the automatic numbering after the database in the three-dimensional arrangement and adjustment CAD is completed. Accordingly, the manual numbering of the parts numbers must be performed.

Referring to FIG. 6, in the line information (Table 3), the line name is used as the classification item. The information concerning the allowance of the manual numbering and the parent-to-child relationship between the parts having the same parts number is stored in the line information (Table 3). The parts having the line name for which the manual numbering is allowed in the line information (Table 3) are extracted from the database in the three-dimensional arrangement and adjustment CAD in the parts information (Table 2A) by the extracting means 22 to prepare the manually-numbered parts information (Table 11).

The parts numbers numbered in the advance procurement are manually input by the manually-numbering means 23 while confirming the line names, which is the classification items; other information such as the design pressure and temperature, which is the attributes of the classification items; and the parts specifications, tabulated in the manually-numbered parts information (Table 11).

The information, indicating that from which line in the reduced parts information (Table 2) the parts are acquired, is given to the parts in the manually-numbered parts information (Table 11). The data on one part is stored in one line in the reduced parts information (Table 2A). The data in the reduced parts information (Table 2A) is returned to the database in the three-dimensional arrangement and adjustment CAD based on the line numbers. In other words, the line numbers in the database in the three-dimensional arrangement and adjustment CAD are used to reflect the parent-to-child relationship between the parts having the parts numbers that are equal to the manually-numbered parts numbers in the database in the three-dimensional arrangement and adjustment CAD.

The database in the three-dimensional arrangement and adjustment CAD is used to perform the quantity totalization in FIG. 2. In the quantity totalizer for the three-dimensional arrangement and adjustment CAD, according to the second embodiment, owing to the structure shown in FIG. 7, the automatically-numbered parts numbers are not mixed with the manually-numbered parts numbers.

Specifically, the line information (Table 3) is used again in the quantity totalization to again confirm the line names for which the manual numbering is allowed. Through this operation, all the automatically-numbered parts are known to the system.

Next, the automatic numbering is performed only for the parts having the same classification item and the same parts specification in the quantity totalization. In contrast, the parts for which the manual numbering is allowed are totalized based on the parts number so as to attain the quantity totalization result. The quantity totalizer for the three-dimensional arrangement and adjustment CAD, according to the second embodiment, is structured such that the previous revisions can be referred to both in the manual numbering and the automatic numbering.

Bulk purchase of the pipe parts is also considered in the quantity totalizer for the three-dimensional arrangement and adjustment CAD, according to the second embodiment.

The specifications of the pipes used in a plant are classified according to intended use. In the quantity totalizer for the three-dimensional arrangement and adjustment CAD, according to the second embodiment, the pipes used in high temperature and high pressure state give weight to the design specifications, and the procurement according to the line specifications and parts specifications is performed in these pipes.

In contrast, the pipes used in low temperature and low pressure state do not need to insist on the specifications shown in the line information.

Accordingly, in the case of the pipes used in low temperature and pressure, it is sufficient to provide the attribute information (parts specifications) for identifying the pipe parts.

Consequently, in the quantity totalizer for the three-dimensional arrangement and adjustment CAD, according to the second embodiment, as shown in FIG. 8, the method in which the parts are classified based only on the parts specifications (parts types and sizes) for totalization is adopted.

With this structure described above, the bulk purchase of the parts has a good effect on the reduction in cost in spite of being rather out of specifications and, therefore, the cost of the material procurement can be reduced.

As described above, according to the quantity totalizer for the three-dimensional arrangement and adjustment CAD in the second embodiment of the present invention, it is possible to provide the quantity totalizer, the quantity totalizing program, and the quantity totalizing method, which are capable of considering the advance arrangement and procurement of the parts and improving the yield rate.

The structures of the quantity totalizers and the quantity totalizing programs for the three-dimensional arrangement and adjustment CAD, according to the above embodiments, are summarized as follows.

A quantity totalizer for a three-dimensional arrangement and adjustment CAD, according to an embodiment, includes: integrating means for referring to parts information stored in the three-dimensional arrangement and adjustment CAD and associating line information, which is separated from the parts information for storage and which is unique to a line, with the parts information to generate integrated information in which the quantity of parts is totalized; numbering means for systematically numbering the integrated information and outputting a quantity totalization result; and comparing means for comparing the quantity totalization result output by the numbering means with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

The parts information preferably includes a parts type and a size in the quantity totalizer for the three-dimensional arrangement and adjustment CAD.

The line information includes, at the least, a fluid name passing through pipes, a working pressure, a working temperature, a material, a wall thickness, and a drawing number.

The quantity totalizer for the three-dimensional arrangement and adjustment CAD may include reducing means for dividing the length of uncountable parts by a fixed length of countable parts for reduction to the number of the countable parts having the fixed length when the uncountable part is longer than the fixed length and for summing up the lengths of the uncountable parts until the fixed length is given for reduction to the number of the countable parts having the fixed length when the uncountable part is shorter than the fixed length.

The quantity totalizer for the three-dimensional arrangement and adjustment CAD may include converting means for converting the parts information stored in the three-dimensional arrangement and adjustment CADs of different types into a uniform data format to collectively manage the converted parts information.

The quantity totalizer for the three-dimensional arrangement and adjustment CAD may include checking means for checking the integrated information against a past quantity totalization result to number parts that have not been numbered.

The quantity totalizer for the three-dimensional arrangement and adjustment CAD may have a template for a form in which necessary information in the quantity totalization result is output.

The quantity totalizer for the three-dimensional arrangement and adjustment CAD may have a conversion function for converting a description language and a unit system of the form and the design drawing.

A quantity totalizer for a three-dimensional arrangement and adjustment CAD, according to another embodiment, includes: integrating means for referring to parts information stored in the three-dimensional arrangement and adjustment CAD and associating line information, which is separated from the parts information for storage and which is unique to a line, with the parts information to generate integrated information in which the quantity of parts is totalized; numbering means for systematically numbering the integrated information and outputting a quantity totalization result; comparing means for comparing the quantity totalization result output by the numbering means with a parts number column in a design drawing produced with the three-dimensional arrangement and adjustment CAD to thereby check the parts having the same parts information and line information against each other and replacing parts numbers in the parts number column in the design drawing produced with the three-dimensional arrangement and adjustment CAD with parts numbers in the quantity totalization result output by the numbering means; extracting means for classifying the parts into automatically numbered parts and manually numbered parts and extracting the parts information and the line information, concerning the manually numbered parts, from a database in the three-dimensional arrangement and adjustment CAD for check; and manually-numbering means for manually numbering the parts having the parts information and the line information extracted by the extracting means.

In the above structure, attribute information concerning the parts, extracted and checked by the extracting means in order to determine the parts manually numbered by the manually-numbering means, includes all of a line name, a parts type and a size, or includes only the parts type and the size.

The parts information is integrated with the line information, which are extracted by the extracting means, to produce a parts list. At least one parts number that is determined in advance is manually input in the parts list by the manually-numbering means, and the manually input data is reflected in the parts number column in the database in the three-dimensional arrangement and adjustment CAD.

The integrating means refers to the line information and the database in the three-dimensional arrangement and adjustment CAD, in which the manually input data input by the manually-numbering means is reflected, to separate the automatically numbered parts from the manually numbered parts and totalizes the number of countable parts and the total length of uncountable parts to thereby produce the quantity totalization result.

The integrating means separates the automatically numbered parts from the manually numbered parts for quantity totalization; compares the information before a revision with the information after the revision; and adds a shortfall before the revision to the information after the revision when the number of parts before the revision is smaller than the number of parts after the revision.

The extracting means functions to give attribute information representing parent-to-child relationship between the parts to a parts list extracted by the extracting means, to reduce the parts numbers of child parts, among the parts that are different in all of a line name, a parts type, and a size or any of them, to the parts numbers of parent parts to collectively number the parts, and to totalize the both the parent parts and the child parts.

A symbol indicating that a yield rate is considered, the symbol being attribute information, is added to the line information to separate parts for which the yield rate is considered from parts for which the yield rate is not considered; the parts information and the line information concerning uncountable parts stored in the database in the three-dimensional arrangement and adjustment CAD are extracted by the extracting means for check to determine the uncountable parts for which the yield rate is considered; true lengths, which are the actual lengths of the uncountable parts, are calculated by the reducing means for the uncountable parts for which the yield rate is considered; and extra lengths, which is the difference between the true lengths and a fixed length at the time of purchase, input in advance, are calculated.

A symbol indicating that a yield rate is considered, the symbol being attribute information, is added to the line information to separate parts for which the yield rate is considered from parts for which the yield rate is not considered; the parts information and the line information concerning uncountable parts stored in the database in the three-dimensional arrangement and adjustment CAD are extracted by the extracting means for check to determine the uncountable parts for which the yield rate is considered; a fixed length, which is the length of the uncountable parts at time of purchase, is input by the manually-numbering means; the fixed length is subtracted from true lengths, which are the lengths of the uncountable parts for which the yield rate is considered, when the true lengths are larger than the fixed length to reduce the uncountable parts to uncountable parts having lengths smaller than the fixed length; extra lengths are calculated by subtracting the true lengths, which is the actual lengths of the uncountable parts, from the fixed length to compare the true lengths of all the parts for which the extra lengths are calculated with the extra lengths thereof; addition of a longest true length to a shortest extra length is repeated to reduce the uncountable parts to the countable parts having the fixed length; and the number of the countable parts having the fixed length is totalized.

A fixed length, which is the length of uncountable parts at the time of purchase, is manually input, by the manually-numbering means, in a parts list extracted by the extracting means, and the input information is reflected in a fixed length column in the parts information stored in the database in the three-dimensional arrangement and adjustment CAD.

The line information is stored in a table different from a table including a fixed length and, when the line information is specified, the fixed length of the corresponding uncountable parts is reflected in a parts list extracted by the extracting means.

The quantity totalizing methods for the three-dimensional arrangement and adjustment CAD, according to the above embodiments, will be summarized as follows:

A quantity totalizing method for a three-dimensional arrangement and adjustment CAD, according to an embodiment of the present invention, includes: the steps of referring to parts information stored in the three-dimensional arrangement and adjustment CAD and associating line information, which is separated from the parts information for storage and which is unique to a line, with the parts information to generate integrated information in which the quantity of parts is totalized; systematically numbering the integrated information and producing a quantity totalization result; and comparing the quantity totalization result with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

The parts information includes a parts type and a size in this quantity totalizing method.

The line information may include, at the least, a fluid name passing through pipes, a working pressure, a working temperature, a material, a wall thickness, and a drawing number.

The lengths of the uncountable parts longer than a fixed length of countable parts, among the uncountable parts arranged and adjusted by the three-dimensional arrangement and adjustment CAD, may be divided by the fixed length of countable parts for reduction to the number of the countable parts having the fixed length, and the lengths of the uncountable parts shorter than the fixed length may be summed up until the fixed length is given for reduction to the number of the countable parts having the fixed length in order to perform the quantity totalization.

The parts information stored in the three-dimensional arrangement and adjustment CADs of different types may be converted into a uniform data format to collectively manage the converted parts information.

The integrated information may be checked against a past quantity totalization result to number parts that have not been numbered.

The quantity totalizer for the three-dimensional arrangement and adjustment CAD may have a template for a form to output a necessary quantity totalization result as the form.

The quantity totalizer for the three-dimensional arrangement and adjustment CAD may have a database for multiple languages and unit systems and may convert a description language and a unit system of the form and the design drawing.

A quantity totalizing method for a three-dimensional arrangement and adjustment CAD, according to another embodiment, includes: the steps of referring to parts information stored in the three-dimensional arrangement and adjustment CAD, associating line information, which is separated from the parts information for storage and which is unique to a line, with the parts information, referring to the line information and the parts information stored in the three-dimensional arrangement and adjustment CAD to classify parts into automatically numbered parts and manually numbered parts, and associating the line information with the parts information to generate integrated information in which the quantity of the parts is totalized; extracting the line information concerning the manually numbered parts from a database in the three-dimensional arrangement and adjustment CAD; manually numbering the parts having the extracted line information, and systematically numbering the integrated information to produce a quantity totalization result; and comparing the quantity totalization result with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

In the above structure, a line name, a parts type, and a size, among attribute information concerning the parts, are checked to determine the parts manually numbered, or only the parts type and the size are checked to determine the parts manually numbered and the determined parts are extracted by the extracting means.

The parts information is integrated with the line information, which are extracted by the extracting means, to produce a parts list. At least one parts number that is determined in advance is manually input in the parts list, and the manually input data is reflected in the parts number column in the database in the three-dimensional arrangement and adjustment CAD.

The line information and the database in the three-dimensional arrangement and adjustment CAD, in which the manually input data is reflected, are referred to to separate the automatically numbered parts from the manually numbered parts and the number of countable parts and the total length of uncountable parts are totalized to produce the quantity totalization result.

The automatically numbered parts are separated from the manually numbered parts for the quantity totalization; the information before a revision is compared with the information after the revision; and a shortfall before the revision is added to the information after the revision when the number of parts before the revision is smaller than the number of parts after the revision.

The attribute information representing the parent-to-child relationship between the parts is given to the parts list extracted by the extracting means; the parts numbers of child parts, among the parts that are different in all of a line name, a parts type, and a size or any of them, are reduced to the parts numbers of parent parts to collectively number the parts; and the both the parent parts and the child parts are totalized for the quantity totalization.

A symbol indicating that a yield rate is considered, the symbol being attribute information, is added to the line information to separate parts for which the yield rate is considered from parts for which the yield rate is not considered; the parts information and the line information concerning uncountable parts stored in the database in the three-dimensional arrangement and adjustment CAD are extracted by the extracting means for check to determine the uncountable parts for which the yield rate is considered; true lengths, which are the actual lengths of the uncountable parts, are calculated for the uncountable parts for which the yield rate is considered; and extra lengths, which is the difference between the true lengths and a fixed length at the time of purchase, input in advance, are calculated.

A symbol indicating that a yield rate is considered, the symbol being attribute information, is added to the line information to separate parts for which the yield rate is considered from parts for which the yield rate is not considered; the parts information and the line information concerning uncountable parts stored in the database in the three-dimensional arrangement and adjustment CAD are extracted by the extracting means for check to determine the uncountable parts for which the yield rate is considered; a fixed length, which is the length of the uncountable parts at time of purchase, is input by the manually-numbering means; the fixed length is subtracted from true lengths, which are the lengths of the uncountable parts for which the yield rate is considered, when the true lengths are larger than the fixed length to reduce the uncountable parts to uncountable parts having lengths smaller than the fixed length; extra lengths are calculated by subtracting the true lengths, which is the actual lengths of the uncountable parts, from the fixed length to compare the true lengths of all the parts for which the extra lengths are calculated with the extra lengths thereof; addition of a longest true length to a shortest extra length is repeated to reduce the uncountable parts to the countable parts having the fixed length; and the number of the countable parts having the fixed length is totalized.

A fixed length, which is the length of uncountable parts at the time of purchase, is manually input, by the manually-numbering means, in a parts list extracted by the extracting means, and the input information is reflected in a fixed length column in the parts information stored in the database in the three-dimensional arrangement and adjustment CAD.

The line information is stored in a table different from a table including a fixed length and, when the line information is specified, the fixed length is automatically reflected in a parts list extracted by the extracting means.

INDUSTRIAL APPLICABILITY

According to a quantity totalizer, a quantity totalizing program, and a quantity totalizing method for a three-dimensional arrangement and adjustment CAD, of the present invention, it is possible to systematically manage the parts numbers and to improve the efficiency of the quantity totalization. In addition, according to the present invention, advance arrangement and procurement of the parts can be considered, so that the quantity totalization can be efficiently performed.

The invention claimed is:

1. A quantity totalizer for a three-dimensional arrangement and adjustment CAD, comprising:
   integrating means for referring to parts information stored in the three-dimensional arrangement and adjustment CAD and associating line information, which is separated from the parts information for storage and which is unique to a line, with the parts information to generate integrated information in which the quantity of parts is totalized;
   numbering means for systematically numbering the integrated information and outputting a quantity totalization result; and
   comparing means for comparing the quantity totalization result output by the numbering means with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

2. The quantity totalizer for the three-dimensional arrangement and adjustment CAD according to claim 1, wherein the parts information includes a parts type and a size.

3. The quantity totalizer for the three-dimensional arrangement and adjustment CAD according to claim 1, wherein the line information includes, at the least, a fluid name passing through pipes, a working pressure, a working temperature, a material, a wall thickness, and a drawing number.

4. The quantity totalizer for the three-dimensional arrangement and adjustment CAD according to claim 1, further comprising:
   reducing means for dividing the length of uncountable parts by a fixed length of countable parts for reduction to the number of the countable parts having the fixed length when the uncountable part is longer than the fixed length and for summing up the lengths of the uncountable parts until the fixed length is given for reduction to the number of the countable parts having the fixed length when the uncountable part is shorter than the fixed length.

5. The quantity totalizer for the three-dimensional arrangement and adjustment CAD according to claim 1, further comprising:
   converting means for converting the parts information stored in the three-dimensional arrangement and adjustment CADs of different types into a uniform data format to collectively manage the converted parts information.

6. The quantity totalizer for the three-dimensional arrangement and adjustment CAD according to claim 1, further comprising:
   checking means for checking the integrated information against a past quantity totalization result to number parts that have not been numbered.

7. The quantity totalizer for the three-dimensional arrangement and adjustment CAD according to claim 1, wherein a template for a form, in which necessary information in the quantity totalization result is output, is provided.

8. The quantity totalizer for the three-dimensional arrangement and adjustment CAD according to claim 1, having a conversion function for converting a description language and a unit system of the form and the design drawing.

9. A quantity totalizer for a three-dimensional arrangement and adjustment CAD, comprising:
   integrating means for referring to parts information stored in the three-dimensional arrangement and adjustment CAD and associating line information, which is separated from the parts information for storage and which is unique to a line, with the parts information to generate integrated information in which the quantity of parts is totalized;
   numbering means for systematically numbering the integrated information and outputting a quantity totalization result;
   comparing means for comparing the quantity totalization result output by the numbering means with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means;
   extracting means for classifying the parts into automatically numbered parts and manually numbered parts and extracting the parts information and the line information, concerning the manually numbered parts, from a database in the three-dimensional arrangement and adjustment CAD for check; and manually-numbering means for manually numbering the parts having the parts information and the line information extracted by the extracting means.

10. The quantity totalizer for the three-dimensional arrangement and adjustment CAD according to claim 9, wherein attribute information concerning the parts, which is extracted and checked by the extracting means in order to determine the parts manually numbered by the manually-numbering means, includes all of a line name, a parts type, and a size or includes only the parts type and the size.

11. The quantity totalizer for the three-dimensional arrangement and adjustment CAD according to claim 9, wherein the parts information is integrated with the line information, which are extracted by the extracting means, to produce a parts list, at least one parts number that is determined in advance is manually input in the parts list by the manually-numbering means, and the manually input data is reflected in the parts number column in the database in the three-dimensional arrangement and adjustment CAD.

12. The quantity totalizer for the three-dimensional arrangement and adjustment CAD according to claim 9, wherein the integrating means refers to the line information and the database in the three-dimensional arrangement and adjustment CAD, in which the manually input data input by the manually-numbering means is reflected, to separate the automatically numbered parts from the manually numbered parts and totalizes the number of countable parts and the total length of uncountable parts to produce the quantity totalization result.

13. The quantity totalizer for the three-dimensional arrangement and adjustment CAD according to claim 9, wherein the integrating means separates the automatically numbered parts from the manually numbered parts for quantity totalization, compares the information before a revision with the information after the revision, and adds a shortfall before the revision to the information after the revision when the number of parts before the revision is smaller than the number of parts after the revision.

14. The quantity totalizer for the three-dimensional arrangement and adjustment CAD according to claim 9, wherein the extracting means gives attribute information representing parent-to-child relationship between the parts to a parts list extracted by the extracting means, reduces the parts numbers of child parts, among the parts that are different in all of a line name, a parts type, and a size or any of them, to the parts numbers of parent parts to collectively number the parts, and totalizes the both the parent parts and the child parts.

15. The quantity totalizer for the three-dimensional arrangement and adjustment CAD according to claim 9, wherein a symbol indicating that a yield rate is considered, the symbol being attribute information, is added to the line information to separate parts for which the yield rate is considered from parts for which the yield rate is not considered; the parts information and the line information concerning uncountable parts stored in the database in the three-dimensional arrangement and adjustment CAD are extracted by the extracting means for check to determine the uncountable parts for which the yield rate is considered; true lengths, which are the actual lengths of the uncountable parts, are calculated by the reducing means for the uncountable parts for which the yield rate is considered; and extra lengths, which is the difference between the true lengths and a fixed length at the time of purchase, input in advance, are calculated.

16. The quantity totalizer for the three-dimensional arrangement and adjustment CAD according to claim 9, wherein a symbol indicating that a yield rate is considered, the symbol being attribute information, is added to the line information to separate parts for which the yield rate is considered from parts for which the yield rate is not considered; the parts information and the line information concerning uncountable parts stored in the database in the three-dimensional arrangement and adjustment CAD are extracted by the extracting means for check to determine the uncountable parts for which the yield rate is considered; a fixed length, which is the length of the uncountable parts at time of purchase, is input by the manually-numbering means; the fixed length is subtracted from true lengths, which are the lengths of the uncountable parts for which the yield rate is considered, when the true lengths are larger than the fixed length to reduce the uncountable parts to uncountable parts having lengths smaller than the fixed length; extra lengths are calculated by subtracting the true lengths, which is the actual lengths of the uncountable parts, from the fixed length to compare the true lengths of all the parts for which the extra lengths are calculated with the extra lengths thereof; addition of a longest true length to a shortest extra length is repeated to reduce the uncountable parts to the countable parts having the fixed length; and the number of the countable parts having the fixed length is totalized.

17. The quantity totalizer for the three-dimensional arrangement and adjustment CAD according to claim 9, wherein a fixed length, which is the length of uncountable parts at the time of purchase, is manually input, by the manually-numbering means, in a parts list extracted by the extracting means, and the input information is reflected in a fixed length column in the parts information stored in the database in the three-dimensional arrangement and adjustment CAD.

18. The quantity totalizer for the three-dimensional arrangement and adjustment CAD according to claim 9, wherein the line information is stored in a table different from a table including a fixed length and, when the line information is specified, the fixed length of the corresponding uncountable parts is reflected in a parts list extracted by the extracting means.

19. A quantity totalizing method for a three-dimensional arrangement and adjustment CAD, comprising the steps of:
referring to parts information stored in the three-dimensional arrangement and adjustment CAD and associating line information, which is separated from the parts information for storage and which is unique to a line, with the parts information to generate integrated information in which the quantity of parts is totalized;
systematically numbering the integrated information and producing a quantity totalization result; and
comparing the quantity totalization result with a parts number column in a design drawing produced with the three-dimensional arrangement and adjustment CAD to check the parts having the same parts information and line information against each other and replacing parts numbers in the parts number column in the design drawing produced with the three-dimensional arrangement and adjustment CAD with parts numbers in the quantity totalization result output by the numbering means.

* * * * *